United States Patent [19]

Sakaguchi

[11] Patent Number: 4,716,776

[45] Date of Patent: Jan. 5, 1988

[54] ROTARY TO LINEAR CONVERTER WITH LEAD SCREW

[75] Inventor: Takahiro Sakaguchi, Tokyo, Japan

[73] Assignee: Teac Corporation, Tokyo, Japan

[21] Appl. No.: 829,426

[22] Filed: Feb. 13, 1986

[30] Foreign Application Priority Data

Feb. 19, 1985 [JP] Japan ................... 60-31023

[51] Int. Cl.⁴ .............................................. F16H 1/20
[52] U.S. Cl. .................. 74/89.15; 74/424.8 R
[58] Field of Search .......... 74/89.1 J, 424.8 R, 74/28

[56] References Cited

U.S. PATENT DOCUMENTS

| | | | |
|---|---|---|---|
| 2,663,929 | 12/1953 | Carpenter | 74/424.8 R |
| 2,894,408 | 7/1959 | Verhoeff | 74/428.8 R |
| 3,331,257 | 7/1967 | Gerber | 74/428.8 R |
| 3,440,886 | 4/1969 | Mecker | 74/89.15 |
| 3,493,233 | 2/1970 | Foufounis | 74/89.15 X |
| 4,030,137 | 6/1977 | Dalziel | |
| 4,274,294 | 6/1981 | Siryj et al. | 74/89.15 |
| 4,333,116 | 6/1982 | Schoettle et al. | 74/89.15 R |
| 4,395,924 | 8/1983 | Callahan | 74/428.8 R |

Primary Examiner—Randolph A. Reese
Assistant Examiner—Joseph A. Fischetti
Attorney, Agent, or Firm—Woodcock Washburn Kurtz Mackiewicz & Norris

[57] ABSTRACT

A rotary to linear converter is disclosed as adapted for transporting a magnetic transducer head from track to track on a magnetic disk in a disk drive. Included are an electric stepping motor coupled to a lead screw, and a head carriage engaged with the lead screw for linear travel in response to the rotation thereof. A pin is engaged with a helical groove of the lead screw. The pin is arranged in perpendicular to the lead screw. Consequently, even if distance between the lead screw and a guide rod of the head carriage deviates from a desired value, the pin is not displaced in the extending direction of the lead screw.

3 Claims, 6 Drawing Figures

ROTARY TO LINEAR CONVERTER WITH LEAD SCREW

BACKGROUND OF THE INVENTION

The present invention relates to rotary to linear converters with lead screw. A rotary to linear converter according to the invention can be applied as head positioning mechanism of flexible magnetic disk drive.

The head positioning mechanism of disk drive comprises a stepping motor, a lead screw connected thereto, a head carriage to support a magnetic transducer head, a guide rod to move the head carriage along the radial direction of the magnetic disk, and an engagement member disposed between the lead screw and the head carriage.

U.S. Pat. No. 4,030,137 of Daiziel discloses an engagement member composed of a tubular portion which is threaded to mate with a lead screw. On the other hand, in order to simplify structure of the engagement member, another structure is also known where a ball or a pin is engaged with a helical groove of a lead screw.

In assembling work of a head positioning mechanism using a pin or a ball as engagement member, it is difficult to maintain constant distance between the lead screw and a guide rod of the carriage. If the distance varies, position of the pin in the axial direction of the lead screw also varies. As a result, position of the transducer head moving together with the pin varies on the disk and therefore the transducer head cannot be disposed to a desired position on the disk. Such problems may occur when a ball is used as engagement member.

SUMMARY OF THE INVENTION

An object of the invention is to provide a rotary to linear converter wherein, even if distance between the lead screw and the guide rod deviates from a desired value, position of the carriage in the extending direction of the guide rod varies little or not at all.

In order to attain the above object, a rotary to linear converter of the invention comprises a lead screw coupled to a drive motor such as a stepping motor, and a guide rod arranged in parallel to the lead screw. The guide rod guides a carriage in extending direction of the guide rod. In order to convert rotational motion of the lead screw into linear motion of the carriage a pin is disposed between the lead screw and the carriage. The pin is not arranged along a helical groove of the lead screw but in perpendicular to the lead screw. Consequently, even if distance between the lead screw and the guide rod deviates slightly from a desired value the displacement of the pin in the extending direction of the lead screw becomes zero or very small.

The above and other objects, features and advantages of this invention and the manner of attaining them will become more apparent, and the invention itself will best be understood, from a study of the following description of a preferred embodiment illustrated in the attached drawings.

DETAILED DESCRIPTION OF THE INVENTION

Figure 1:
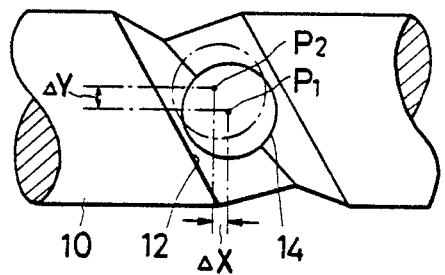
FIG. 1 is a plan view of a head positioning mechanism in the prior art illustrating a lead screw and a ball.
Figure 2:
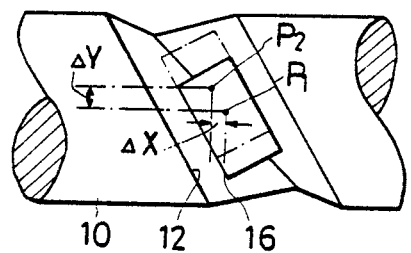
FIG. 2 is a plan view of a head positioning mechanism in the prior art illustrating a lead screw and a pin.

FIG. 1 and FIG. 2 show two typical lead screw mechanisms in the prior art so that the features and advantages of the invention are made apparent. A lead screw mechanism in FIG. 1 comprises a lead screw 10, and a steel ball 14 engaged with a helical groove 12 of the lead screw 10. The steel ball 14 is held to a head carriage (not shown). The head carriage is guided by a guide rod (not shown) arranged in parallel to the lead screw 10 and movable in the extending direction of both the lead screw 10 and the guide rod. During assembling the lead screw mechanism, if distance between the lead screw 10 and the guide rod deviates by $\Delta Y$ from a desired value in the Y-axis direction (vertical direction) in FIG. 1, position of the ball 14 is shifted from position of solid line to position of dash-and-dot line shown in FIG. 1. Since the ball 14 is displaced along the helical groove 12, distance between the center position $P_1$ of the ball 14 shown by solid line and the center position $P_2$ of the ball 14 shown by dash-and-dot line has not only Y-axis direction component $\Delta Y$ but also X-axis direction component $\Delta X$. Since the X-axis direction corresponds to radial direction in a magnetic disk, if the ball 14 is shifted by $\Delta X$ in the X-axis direction, position of the transducer head moving integral with the ball 14 on the disk varies in the disk radial direction.

Another lead screw mechanism in the prior art shown in FIG. 2 comprises a lead screw 10, and a metal pin 16 engaged with a helical groove 12 of the lead screw 10. Also in this lead screw mechanism, if distance in the Y-axis direction between the lead screw 10 and a guide rod (not shown) varies by $\Delta Y$, the pin 16 is moved from position of solid line to position of dash-and-dot line so that the center position of the pin 16 varies from P1 to P2. As a result, the pin 16 is shifted not only by $\Delta Y$ in the Y-axis direction but also by $\Delta X$ in the X-axis direction.

Figure 3:
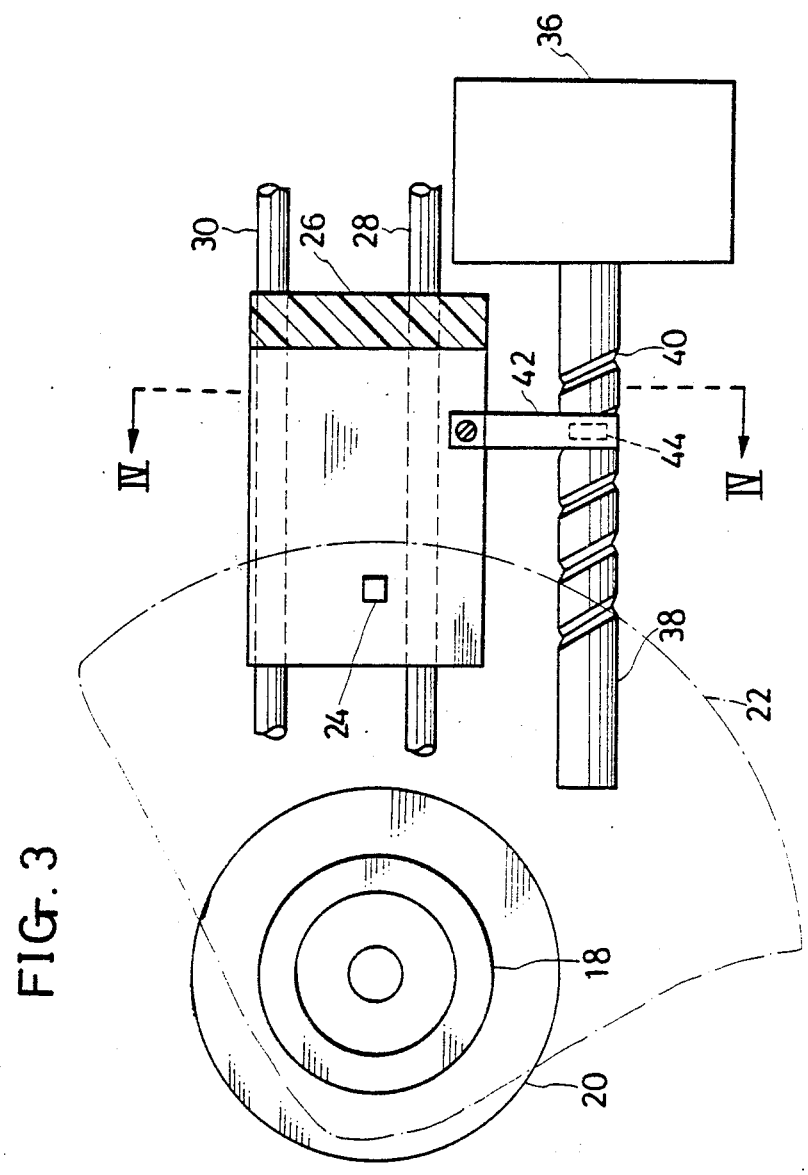
FIG. 3 is a plan view of part of a data transfer apparatus having a head positioning mechanism according to the invention.
Figure 4:
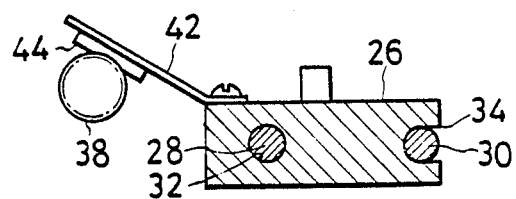
FIG. 4 is a sectional view of the head positioning mechanism taken in line IV—IV of FIG. 3.

FIG. 3 shows a data transfer apparatus having a lead screw mechanism according to the invention so as to solve above-mentioned disadvantages of the two lead screw mechanisms in the prior art shown in FIG. 1 and FIG. 2. The data transfer apparatus has a turn table 18 which is connected directly to a drive shaft (not shown) of a disk drive motor 20. A flexible magnetic disk 22 is mounted and clamped on the turn table 18, and rotated for data transfer at a magnetic transducer head 24. The transducer head 24 is mounted on a carriage 26. The carriage 26 is guided in the radial direction of the disk 22 by first and second rods 28, 30. As clearly seen in FIG. 4, the first guide rod 28 is inserted in a through hole 32 provided on the carriage 26, and the second guide rod 30 is inserted in a U-like groove 34 provided on the carriage 26. The first and second guide rods 28, 30 are mounted on a frame (not shown).

The data transfer apparatus has a stepping motor 36 for moving the transducer head 24 onto that selected from a plurality of recording tracks in concentric arrangement on the surface of the disk 22. A lead screw 38 having a helical groove 40 is connected to a rotor (not shown) of the stepping motor 36. The lead screw 38 is arranged in parallel to the first and second guide rods 28, 30, and journaled by a bearing (not shown).

Figure 5:
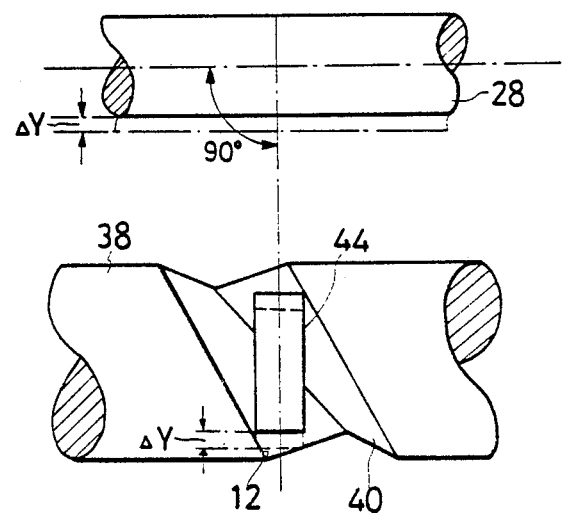
FIG. 5 is a plan view of the head positioning mechanism in FIG. 3 illustrating relation in principle of the lead screw, the guide rod and the pin.

The head carriage 26 has an arm 42 made of a leaf spring extending in lateral direction of the carriage 26. A steel pin 44 is fixed to the arm 42, and engaged with the V-like groove 40 of the lead screw 38. The pin 44 is arranged to extend in direction perpendicular to the extending direction of the lead screw 38, and engaged with the groove 40 in accompanied state by biasing force in the direction of the lead screw 38 supplied by the arm 42 having spring action. As shown in FIG. 5, the pin 44 does not extend along the extending direction of the groove 40 of the lead screw 38 but contacts with the wall surface of the groove 40. As a result, the pin 44 can follow the rotational motion of the lead screw 38 and travel along the groove 40. The pin 44 is engaged at the center portion with the groove 40, but both end portions of the pin 44 do not contact with the groove 40 as clearly seen in FIG. 4.

If the stepping motor 36 shown in FIG. 3 is rotated, the lead screw 38 is also rotated and the pin 44 is moved in the extending direction of the lead screw 38. Since the pin 44 is made integral with the head carriage 26 through the arm 42, if the pin 44 is moved the transducer head 24 on the head carriage 26 is also moved in the radial direction of the disk 22. As a result, positioning of the transducer head 24 onto a desired track of the disk 22 becomes possible.

When the pair of the guide rods 28, 30 and the stepping motor 36 are to be mounted on the frame, it is quite difficult to set distance between the first guide rod 28 and the lead screw 38 to a desired value without error. If the first guide rod 28 is shifted by ΔY in the Y-axis direction from position of solid line to position of dash-and-dot line as shown in FIG. 5, the head carriage 26 and the pin 44 guided by the first guide rod 28 are also displaced in the same direction as that of the first guide rod 28. That is, the pin 44 is displaced by ΔY from position of solid line to position of dash-and-dot line. However, the pin 44 is not displaced in the X-axis direction being the extending direction of the lead screw 38. Consequently, during assembling the data transducer apparatus or after assembling it, even if distance between the first guide rod 28 and the lead screw 38 deviates from a desired value, the transducer head 24 is not shifted in the radial direction of the disk 22 based on the deviation of the distance. Accordingly, correlation between angular position of the rotor of the stepping motor 36 and position of the transducer head 24 on the disk 22 can be prevented from error.

Figure 6:
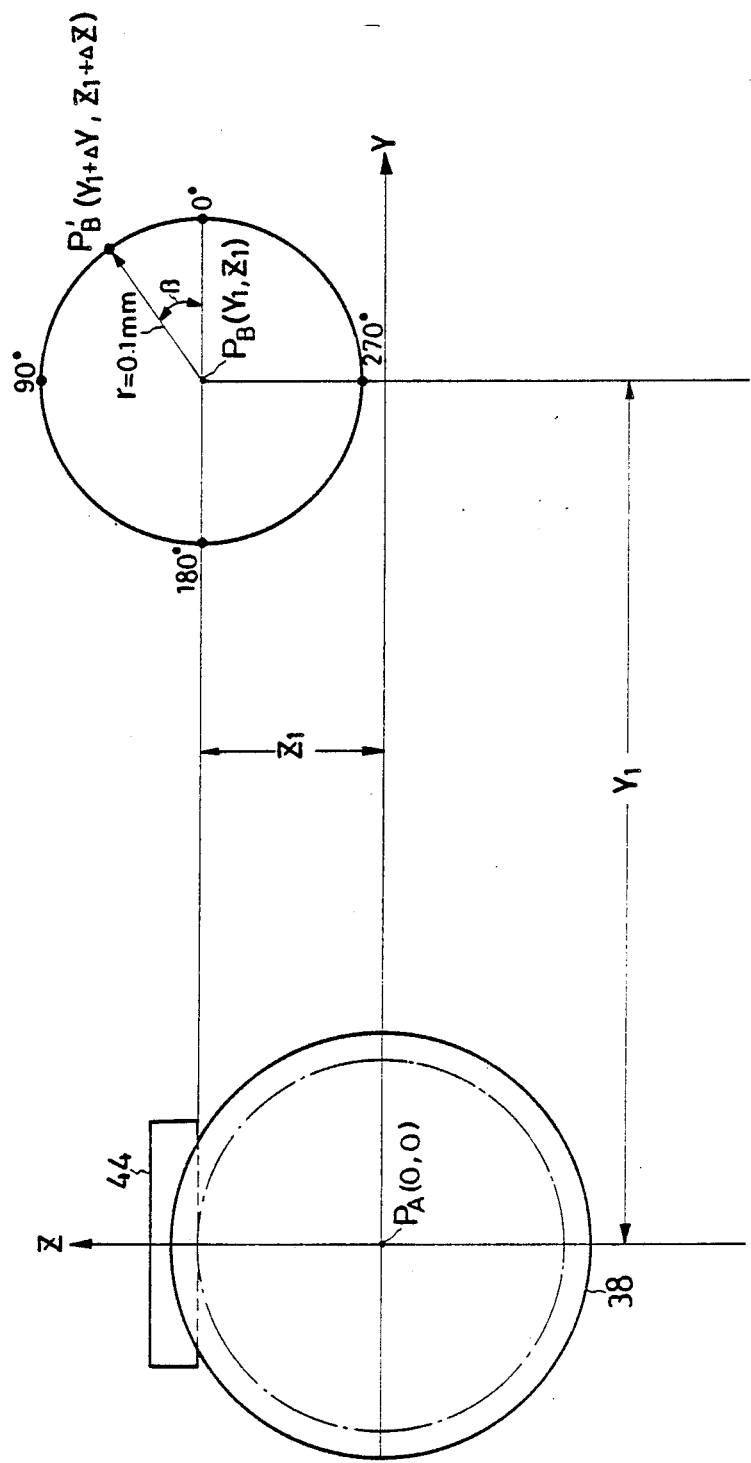
FIG. 6 is a plan view illustrating relation between the lead screw and the guide rod.

In FIG. 5, position of the guide rod 28 is varied in the Y-axis direction within the X-Y plane. However, in actual state, position of the guide rod 28 is also varied in the Z-axis direction. Referring to FIG. 6, when the center of the guide rod 28 is varied both in the Z-axis direction and in the Y-axis direction, displacement or error of the pin 44 in the X-axis direction will be described. Assuming that the center $P_A$ of the lead screw 38 be at the center of the coordinates, i.e., point of Y=0, Z=0, perpendicular direction to the pin 44 be the Z-axis direction, desired center position $P_B$ of the guide rod 28 be coordinate point $(Y_1, Z_1)$ on the extension of the pin 44, $Y_1$ be 13.3 mm and $Z_1$ be 1.61922 mm, the center of the guide rod 28 was transferred from the coordinate point $(Y_1, Z_1)$ onto the circumference of radius r (0.1 mm), and variation of the pin in the X-axis direction with respect to various angles ($\beta$), i.e., positioning error of the transducer head 24 was estimated so as to obtain results shown in following table. In comparison, the head positioning error E in the case of using the ball 14 of FIG. 1 in the prior art was estimated in similar manner, and the results are shown in the table at columns of the prior art.

TABLE

| $\beta$ (degree) | Error E (μm) Invention | Error E (μm) Prior Art | $\beta$ (degree) | Error E (μm) Invention | Error E (μm) Prior Art |
|---|---|---|---|---|---|
| 0 | ±0.00 | −15.56 | 180 | ±0.00 | +15.56 |
| 15 | +0.58 | −15.03 | 195 | −0.59 | +15.02 |
| 30 | +1.11 | −13.49 | 210 | −1.13 | +13.46 |
| 45 | +1.58 | −11.03 | 225 | −1.60 | +10.97 |
| 60 | +1.94 | −7.82 | 240 | −1.95 | −7.73 |
| 75 | +2.16 | −4.08 | 255 | −2.17 | +3.97 |
| 90 | +2.24 | −0.06 | 270 | −2.24 | +0.06 |
| 105 | +2.17 | +3.97 | 285 | −2.16 | −4.08 |
| 120 | +1.95 | +7.73 | 300 | −1.94 | −7.82 |
| 135 | +1.59 | +10.97 | 315 | −1.58 | −11.03 |
| 150 | +0.13 | +13.45 | 330 | −1.11 | −13.48 |
| 165 | +0.58 | +15.02 | 345 | −0.58 | −15.03 |

As clearly seen from the table, even if the center position of the guide rod 28 is shifted from the desired center position $P_B(Y_1, Z_1)$ onto the circumference with radius of 0.1 mm, when angle $\beta$ is 0 or 180 degrees, the error E becomes zero because the shift does not exist in the Z-axis direction. The error E is produced in other angular positions, but the maximum value and the mean value of the error becomes small in comparison to examples in the prior art. Accordingly, when position of the guide rod 28 varies at random, the probability of the error E being larger than that of the prior art is quite small.

The preferred embodiment disclosed herein is meant purely to illustrate or explain and not to impose limitations upon the invention, as a variety of modifications will readily occur to the specialists on the basis of this disclosure. The following is a brief list of such modifications:

1. The pin 44 may be disposed to lower side of the lead screw 38.
2. The lead screw mechanism according to the invention is not limited to the flexible magnetic disk drive, but it can be applied, for example, to a data conversion apparatus between an optical transducer head and a disk-like medium.

What is claimed is:

1. A rotary to linear converter, particularly well suited for use in transporting a transducer head from track to track on a disk-like record medium in apparatus for data transfer therewith, comprising:

(a) a drive motor;
   (b) a lead screw coupled to the drive motor thereby to be rotated, the lead screw having a helical groove cut therein;
   (c) guide means including a guide rod extending parallel to the lead screw with a preassigned spacing therebetween;
   (d) a carriage reciprocably movable along the guide rod; and
   (e) a pin mounted to the carriage for joint movement therewith along the guide rod and slidably engaged in the helical groove in the lead screw for translating the rotation of the lead screw into the linear travel of the carriage along the guide rod;

(f) the pin extending substantially at right angles with the lead screw for a minimal displacement of the pin in the axial direction of the lead screw in spite of possible variations in the preassigned spacing between the lead screw and the guide rod, wherein the pin is a straight member having opposite end portion, the straight member being sufficiently long to have the opposite end portions out of contact with the lead screw.

2. A rotary to linear converter as set forth in claim 1, wherein the helical groove in the lead screw is V-shaped.

3. A rotary to linear converter as set forth in claim 1, further comprising a spring arm through which the pin is mounted to the carriage, the spring arm being self biased to urge the pin against the lead screw.

* * * * *